United States Patent
Ahn et al.

(10) Patent No.: US 11,385,392 B2
(45) Date of Patent: Jul. 12, 2022

(54) LENS OF OPTICAL FIBER LAMP APPARATUS AND OPTICAL FIBER LAMP APPARATUS HAVING THE SAME

(71) Applicants: Hyundai Motor Company, Seoul (KR); Kia Motors Corporation, Seoul (KR); SL Corporation, Daegu (KR)

(72) Inventors: Byoung Suk Ahn, Gwacheon-Si (KR); Ki Hong Lee, Seoul (KR); Jung Wook Lim, Seoul (KR); Seung Sik Han, Hwaseong-si (KR); Ji Yeon Kim, Gyeongsan-si (KR); Jin Hee Yu, Gyeongsan-si (KR)

(73) Assignees: Hyundai Motor Company, Seoul (KR); Kia Motors Corporation, Seoul (KR); SL Corporation, Daegu (KR)

( * ) Notice: Subject to any disclaimer, the term of this patent is extended or adjusted under 35 U.S.C. 154(b) by 36 days.

(21) Appl. No.: 17/095,141

(22) Filed: Nov. 11, 2020

(65) Prior Publication Data
US 2022/0026616 A1 Jan. 27, 2022

(30) Foreign Application Priority Data
Jul. 21, 2020 (KR) ......................... 10-2020-0090485

(51) Int. Cl.
*F21V 8/00* (2006.01)
*F21V 7/00* (2006.01)
*F21Y 115/10* (2016.01)

(52) U.S. Cl.
CPC .......... *G02B 6/0006* (2013.01); *F21V 7/0025* (2013.01); *F21Y 2115/10* (2016.08)

(58) Field of Classification Search
CPC .... G02B 6/0006; G02B 6/0023; G02B 6/003; F21V 7/0025
See application file for complete search history.

(56) References Cited

U.S. PATENT DOCUMENTS

| 2003/0096211 A1* | 5/2003 | Bianchetti ............ A61C 19/004 433/29 |
| 2014/0321137 A1 | 10/2014 | Chen |
| 2017/0123199 A1* | 5/2017 | Jones ...................... F21V 5/048 |

FOREIGN PATENT DOCUMENTS

| JP | 3370193 B2 | 1/2003 |
| JP | 2017-228675 A | 12/2017 |
| KR | 10-2014-0109665 | 9/2014 |

* cited by examiner

*Primary Examiner* — Rajarshi Chakraborty
*Assistant Examiner* — Nathaniel J Lee
(74) *Attorney, Agent, or Firm* — Morgan, Lewis & Bockius LLP

(57) ABSTRACT

Disclosed herein is a lens of an optical fiber lamp apparatus, which allow light to be entirely collected uniformly on an optical fiber when lighting using the optical fiber to minimize a difference in brightness for each optical fiber, improving quality of lighting through the optical fiber, and an optical fiber lamp apparatus having the same.

17 Claims, 5 Drawing Sheets

LENS OF OPTICAL FIBER LAMP APPARATUS AND OPTICAL FIBER LAMP APPARATUS HAVING THE SAME

CROSS REFERENCE TO RELATED APPLICATION

The present application claims priority to Korean Patent Application No. 10-2020-0090485 filed on Jul. 21, 2020, the entire contents of which is incorporated herein for all purposes by this reference.

BACKGROUND OF THE PRESENT INVENTION

Field of the Invention

The present invention relates to a lens of an optical fiber lamp apparatus of collecting light of an optical fiber and an optical fiber lamp apparatus having the same.

Description of Related Art

Generally, vehicles are provided with lamp apparatuses for allowing drivers to clearly see objects in a driving direction when driving at night and notifying other vehicles or other road users of a driving state of an own vehicle.

In addition to the purpose of notifying the driving state, design components of such lamp apparatuses are important. That is, since an image of the vehicle is changed according to a lighting image through the lamp apparatus, it is necessary for advancement of the lighting image through the lamp apparatus.

Accordingly, recently, various lamp apparatuses using optical fibers have been developed. The optical fiber may emit light incident therein to the outside and may be made to be soft, implementing various lighting images.

However, since the optical fiber is formed of a plurality of strands, a lens design is required to collect light with each strand. That is, light emitted from a light source has a predetermined radiation angle, and thus there occurs a difference between a radiation angle of the light and diameters of the plurality of strands of the optical fiber so that the light cannot be collected on the optical fiber. Furthermore, even when the light emitted from the light source is collected, there is a problem in that, since the light is collected at a center portion of the optical fiber, a difference in light occurs in each strand of the optical fiber.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a lens of an optical fiber lamp apparatus, which allow light to be entirely collected uniformly on an optical fiber when lighting using the optical fiber to minimize a difference in brightness for each optical fiber, improving quality of lighting through the optical fiber, and an optical fiber lamp apparatus having the same.

According to one aspect, there is provided a lens of an optical fiber lamp apparatus, which includes a first portion in which an incident portion having one side to which the light from the light source is incident and a first total reflector having a diameter which is gradually increased toward a first side of the first total reflector from the incident portion are formed so that the light irradiated from the light source is reflected to travel toward the other side; and a second portion in which a second total reflector extending from the first side of the first total reflector and having a diameter which is gradually decreased and an exit portion facing optical fibers on one side of the second total reflector are formed, wherein the light which is incident to the first portion and then reflected is guided through the exit portion in the second portion to be collected on the optical fibers.

A length of the first portion may be formed to be smaller than a length of the second portion.

An angle due to a gradual increment in a diameter of the first total reflector may be formed to be greater than an angle due to a gradual decrement in a diameter of the second total reflector.

The incident portion of the first portion may include an incident side portion extending toward a second side of the first total reflector in a form of a straight line such that the light of the light source travels to the first total reflector therethrough, and an incident center portion connected to a distal end portion of the incident side portion in a form of a curved line in the first total reflector such that the light of the light source may be converted into a parallel light to travel to the exit portion.

A diameter of the incident side portion may be gradually decreased toward the other side and extends obliquely or straightly.

A diameter of a side end portion of the second total reflector, which is connected to the first total reflector, may be formed to be greater than at least twice of a diameter of the exit portion.

The exit portion of the second portion may be formed as a flat surface and formed to be greater than a diameter of the optical fiber.

A total length of the first portion and the second portion may be greater than twice or more and less than or equal to fourth times a length of the exit portion of the second portion.

A clearance distance between the exit portion of the second portion and the optical fibers may be less than or equal to a difference between a diameter of the exit portion of the second portion and a diameter of the optical fibers.

A bracket may be formed on an external surface of the second total reflector, and the bracket may be mounted on one side end portion of the second total reflector, which is connected to the second portion.

Meanwhile, according to another aspect, there is provided an optical fiber lamp apparatus including a light source configured to irradiate light; an optical fiber spaced from the light source and configured to irradiate the light to an outside of the optical fiber lamp apparatus when the light is incident on the optical fiber; and a lens mounted between the light source and the optical fiber and including a first portion in which an incident portion having one side to which the light from the light source is incident and a first total reflector having a diameter which is gradually increased toward a first side of the first total reflector from the incident portion are formed so that the light irradiated from the light source is reflected to travel toward the first side of the first total reflector from a second side of the first total reflector having, and a second portion in which a second total reflector extending from the first side of the first total reflector and having a diameter which is gradually decreased and an exit portion facing optical fibers on one side of the second total reflector are formed, guiding the light which is incident to the first portion and then reflected in the second portion to be collected on the optical fiber.

A bracket may be formed on an external surface of the second total reflector, and the bracket may be mounted on one side end portion of the second total reflector, which is connected to the second portion.

The lens may be configured such that the first portion and the second portion are separated, and a bracket may be formed at the other side end portion of the first total reflector of the first portion, which is connected to the second total reflector, and formed at one side end portion of the second total reflector of the second portion, which is connected to the first total reflector.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and other advantages of the present invention

Figure 1:
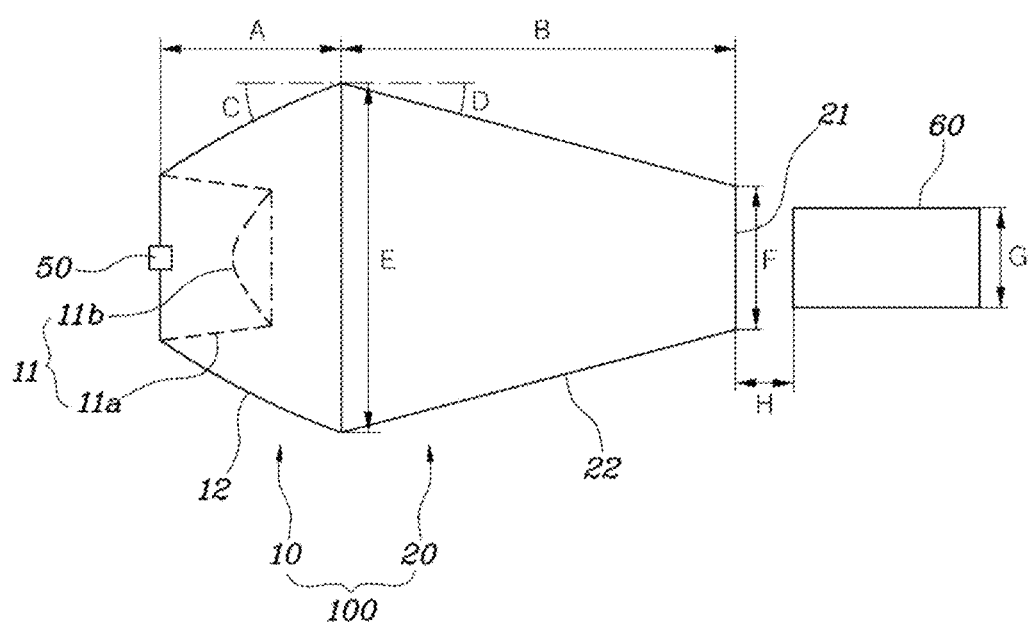
FIG. 1 is a diagram illustrating a lens of an optical fiber lamp apparatus according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a lens 100 of an optical fiber lamp apparatus and an optical fiber lamp apparatus having the same according to exemplary embodiments of the present invention will be described with reference to the accompanying drawings.

Figure 2:
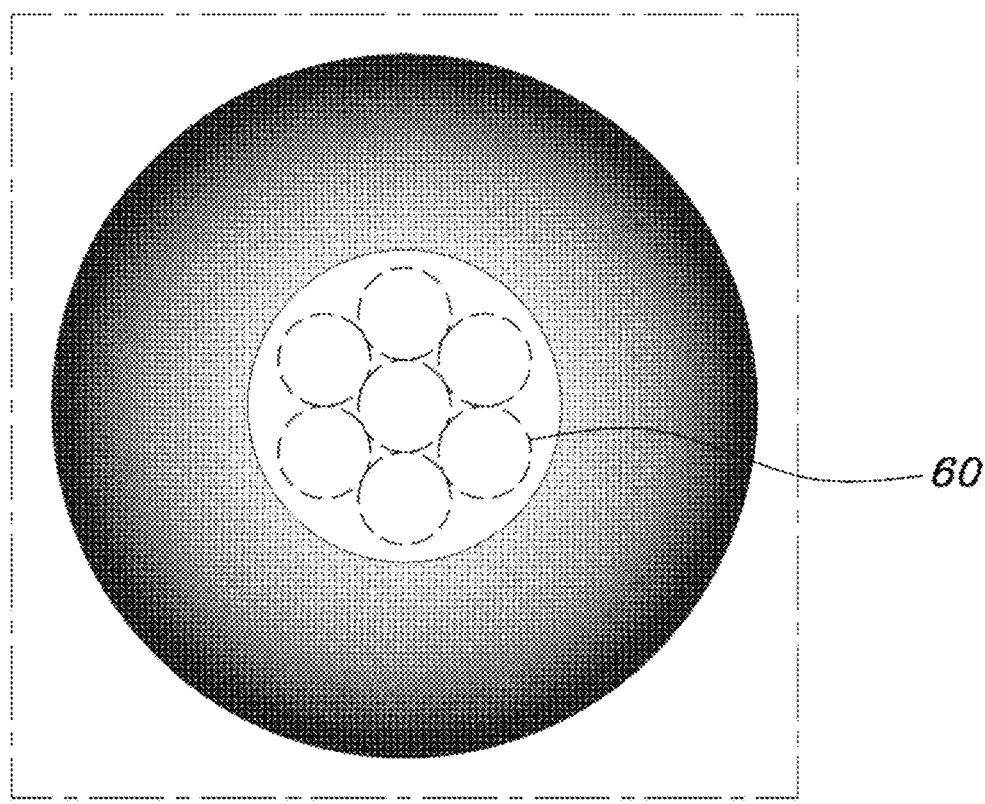
FIG. 2 is a diagram illustrating an effect of the lens of an optical fiber lamp apparatus shown in FIG. 1.
Figure 3:
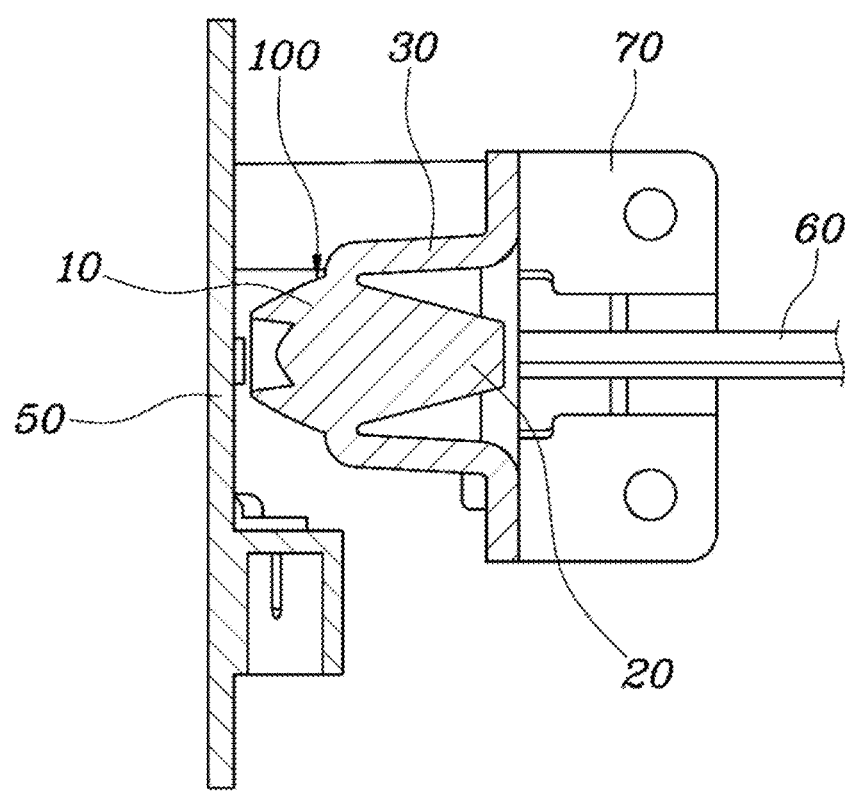
FIG. 3 is a diagram illustrating an optical fiber lamp apparatus according to various exemplary embodiments of the present invention.
Figure 4:
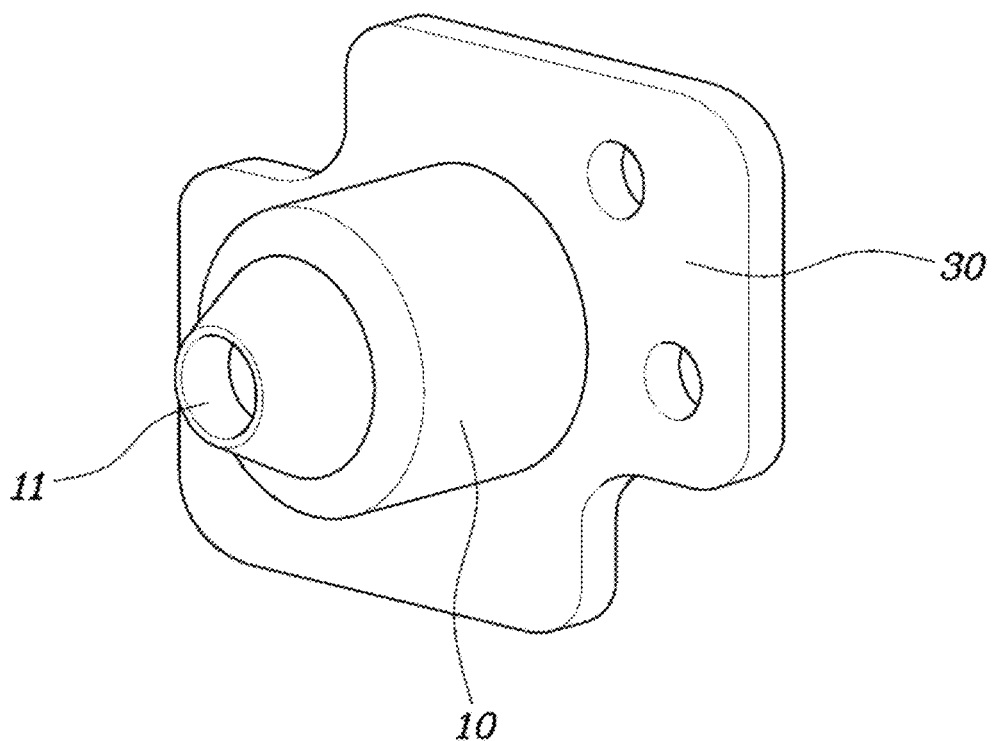
FIG. 4 and FIG. 5 are diagrams illustrating a divided structure of the lens of an optical fiber lamp apparatus according to various exemplary embodiments of the present invention.
Figure 5:
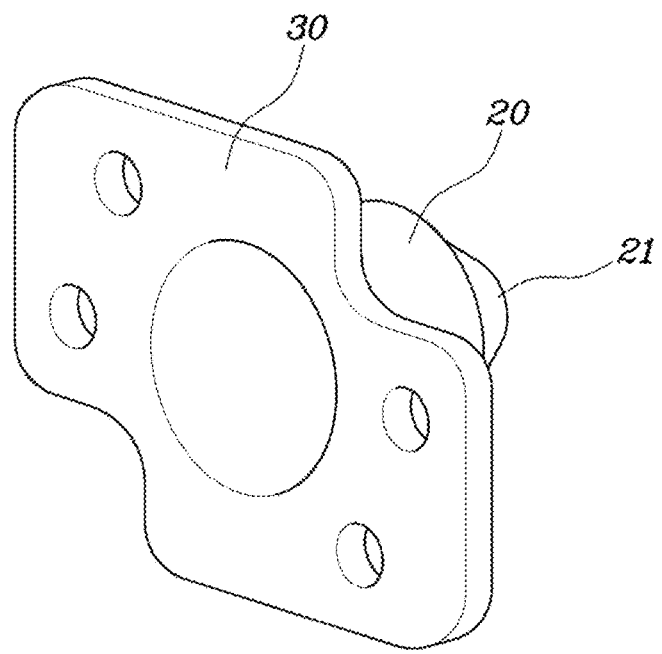

FIG. 1 is a diagram illustrating a lens 100 of an optical fiber lamp apparatus according to various exemplary embodiments of the present invention, FIG. 2 is a diagram illustrating an effect of the lens 100 of an optical fiber lamp apparatus shown in FIG. 1, FIG. 3 is a diagram illustrating an optical fiber lamp apparatus according to various exemplary embodiments of the present invention, and FIG. 4 and FIG. 5 are diagrams illustrating a divided structure of the lens 100 of an optical fiber lamp apparatus according to various exemplary embodiments of the present invention.

As shown in FIG. 1, the lens 100 of an optical fiber lamp apparatus according to various exemplary embodiments of the present invention includes a first portion 10 in which an incident portion 11 having one side to which light from a light source 50 is incident and a first total reflector 12 having a diameter which is gradually increased toward the one side of the first total reflector 12 from the incident portion 11 are formed so that the light irradiated from the light source 50 is reflected to travel toward the other side; and a second portion 20 in which a second total reflector 22 extending from the first total reflector 12 to the other side and having a diameter which is gradually decreased and an exit portion 21 facing optical fibers 60 on one side of the second total reflector 22 are formed. Thus, the light which is incident to the first portion 10 and then reflected is guided in the second portion 20 to be collected on the optical fibers 60.

Here, a light-emitting diode (LED) may be applied to the light source 50, and each of the optical fibers 60 is configured such that, when the light irradiated from the light source 50 is incident thereon, the light is emitted to the outside.

The lens 100 according to various exemplary embodiments of the present invention is mounted between the light source 50 and the optical fibers 60 and allows the light incident from the light source 50 to be collected on the optical fibers 60. The lens 100 is formed of the first portion 10 having the incident portion 11 and the second portion 20 having the exit portion 21, and since the first total reflector 12 of the first portion 10 and the second total reflector 22 of the second portion 20 are integrally coupled, the lens 100 may be formed as one object. Here, the first total reflector 12 of the first portion 10 is formed to have the diameter which is gradually increased toward the other side from the incident portion 11 and have an inclination so that the light irradiated from the light source 50 is reflected to travel toward the exit portion 21 of the second portion 20. The second total reflector 22 of the second portion 20 is formed to have the diameter which is gradually decreased from the first total reflector 12 and have an inclination. The exit portion 21 facing the optical fibers 60 is formed at a distal end portion of the other side of the second total reflector 22 in the second portion 20. Thus, since the light irradiated from the light source 50 is reflected by the first total reflector 12, is reflected by the second total reflector 22 or directly travels to be emitted through the exit portion 21 facing the optical fibers 60, the light is collected on the optical fibers 60.

As described above, the light of the light source 50, which has a non-uniform light distribution, is collected with a uniform light distribution through the lens 100 formed of the first portion 10 and the second portion 20 so that the light is uniformly incident on a plurality of strands of the optical fiber 60, and thus each strand of the optical fiber 60 may emit light with the same brightness.

To describe the present invention in detail, as may be seen in FIG. 1, a length A of the first portion 10 may be formed to be shorter than a length B of the second portion 20. That is, in the lens 100 of the present invention, the light emitted from the light source 50 is reflected by the first portion 10 to travel, and the light reflected through the first portion 10 to travel in the second portion 20 is gradually collected to match the diameter of the optical fiber 60. Thus, the length B of the second portion 20 may be secured to be long and is formed to be longer than the length A of the first portion 10 to allow the light traveling in the second portion 20 to be gradually collected. When the length B of the second portion 20 is formed to be shorter than the length A of the first portion 10, the second total reflector 22 of the second portion 20 forms a drastic inclination so that a quantity of the light is dispersed as the light travels to the exit portion 21.

Therefore, the length B of the second portion 20 is formed to be longer than the length A of the first portion 10 such that the light of the light source 50 is gradually collected in the second portion 20 to be collected through the exit portion 21. Furthermore, when the length A of the first portion 10 is formed to be shorter than the length B of the second portion 20, it is easy to secure an angle of the first total reflector 12 so that, when light is reflected, the light may smoothly travel to the exit portion 21. Thus, a constraint is required that the length A of the first portion 10 is formed to be shorter than the length B of the second portion 20.

Furthermore, an angle C due to a gradual increment in a diameter of the first total reflector 12 may be formed to be greater than an angle D due to a gradual decrement in a diameter of the second total reflector 22. That is, in the lens 100, the angle C of the first total reflector 12 may be determined according to a distance from the incident portion 11 to the exit portion 21. In the instant case, when the angle C of the first total reflector 12 is smaller than the angle D of the second total reflector 22, even though the light irradiated from the light source 50 is reflected by the first total reflector 12, the light cannot directly travel to the exit portion 21. That is, the light is reflected in the lens 100 through the first total reflector 12 and the second total reflector 22 to travel to a drastic inclination so that the quantity of the light is dispersed. Therefore, the angle C of the first total reflector 12 is formed to be greater than the angle D of the second total reflector 22. Furthermore, since the second portion 20 may be formed such that the light is gradually collected through the second total reflector 22, the angle D of the second total reflector 22 is formed to be relatively small such that the length B of the second portion 20 is secured. Therefore, since the angle C of the first total reflector 12 is formed to be greater than the angle D of the second total reflector 22, the light reflected through the first portion 10 may smoothly travel to the exit portion 21, and the length B of the second portion 20 is secured and thus the light is gradually collected such that the light may be evenly collected.

Meanwhile, the incident portion 11 of the first portion 10 may include an incident side portion 11a extending toward the other side in a form of a straight line such that the light of the light source 50 travels to the first total reflector 12, and an incident center portion 11b connected to a distal end portion of the incident side portion 11a in a form of a curved line such that the light of the light source 50 is converted into a parallel light to travel to the exit portion 21.

As described above, the incident portion 11 forms a total internal reflection (TIR) lens shape which allows light to reach the exit portion 21 due to the incident side portion 11a and the incident center portion 11b. Here, the incident side portion 11a extends in a form of a straight line such that the light of the light source 50 directly passes through the incident side portion 11a to travel to the first total reflector 12. Furthermore, the incident center portion 11b is connected to the distal end portion of the incident side portion 11a in a form of a curved line to form a convex shape such that the light of the light source 50 is converted into a parallel light to travel to the exit portion 21. This is based on a design of a TIR lens, and when the light of the light source 50 is incident through the incident portion 11, the light travels to the first total reflector 12 due to the incident side portion 11a and then reflected to travel to the exit portion 21 or the light directly travels to the exit portion 21 such that the light may travel to the exit portion 21 which is a target.

Alternatively, the diameter of the incident side portion 11a may be gradually decreased to obliquely extend to the other side or to extend in a form of a straight line. When the incident side portion 11a extends to the other side and thus the diameter thereof is gradually increased, it is difficult to remove a mold during injection molding of the lens so that easiness of the molding is degraded. Furthermore, when the diameter of the incident side portion 11a is gradually increased toward the other side and thus the incident side portion 11a extends obliquely, the light incident from one side may be totally reflected to be scattered without traveling toward the first total reflector 12. Therefore, the diameter of the incident side portion 11a is gradually decreased toward the other side and extends obliquely or in a form of a straight line such that, when the lens is injection-molded, it is easy to mold the incident portion 11 having the incident side portion 11a and the incident center portion 11b, and the light traveling toward the first total reflector 12 is not refracted to smoothly travel toward the first total reflector 12.

Meanwhile, since the diameter of the second total reflector 22 is gradually decreased toward a second side, a diameter E of one side end portion of the second portion 20 may be formed to be greater than a diameter F of the exit portion 21 on the other side end portion of the second portion 20. Here, in the second total reflector 22, the diameter E of the one side end portion connected to the first total reflector 12 is formed to be greater than twice or more the diameter F of the exit portion 21. This is the same as that the diameter of the distal end portion of the other side of the first total reflector 12 is formed to be greater than twice or more the diameter F of the exit portion 21. Consequently, when the light passing through the first portion 10 travels through the second portion 20, the diameter of the second total reflector 22 is gradually decreased such that the light is gradually collected to improve uniformity of the light. That is, the light reflected by the first total reflector 12 travels toward the exit portion 21. When the diameter E of the one side end portion of the second total reflector 22, which is connected to the first portion 10, is formed less than twice the diameter F of the exit portion 21, the light reflected through the first total reflector 12 interferes with the second total reflector 22 so that a traveling direction of the light may be rapidly changed. Thus, the diameter E of the one side end portion of the second total reflector 22, which is connected to the first portion 10, is formed to be greater than twice or more the diameter F of the exit portion 21 such that the light reflected through the first total reflector 12 smoothly travels toward the exit portion 21, and a distance between the first portion 10 and the exit portion 21 is secured such that uniformity of the light is secured due to gradual collection of the light.

Meanwhile, the exit portion 21 of the second portion 20 may be formed as a flat surface and formed to be greater than the diameter of the optical fiber 60. In the lens 100 of the present invention, since the light passing through the first portion 10 and the second portion 20 already has a uniform light distribution, the exit portion 21 is formed as a flat surface such that the light having the uniform light distribution travels toward the optical fiber 60. Furthermore, since the diameter F of the exit portion 21 of the second portion 20 is formed to be greater than a diameter G of the optical fiber 60, the light emitted through the exit portion 21 is incident on an entirety of the optical fiber 60 including an edge portion such that a difference in brightness between the optical fibers 60 is minimized.

Here, a clearance distance H between the exit portion 21 of the second portion 20 and the optical fiber 60 becomes a difference between the diameter F of the exit portion 21 of the second portion 20 and the diameter G of the optical fiber 60. This is to minimize the light emitted through the exit portion 21 from being emitted to the outside of the optical fiber 60 when the diameter F of the exit portion 21 is formed to be greater than the diameter G of the optical fiber 60. The clearance distance H between the exit portion 21 and the optical fiber 60 is less than or equal to the difference between the diameter F of the exit portion 21 of the second portion 20 and the diameter G of the optical fiber 60 such that entirely uniform light is incident on each strand of the optical fiber 60 and optical efficiency is secured.

Meanwhile, a total length of the first portion 10 and the second portion 20 may be formed greater than twice or more and less than or equal to fourth times the length of the exit portion 21 of the second portion 20. When the total length including the first portion 10 and the second portion 20 is less than twice the length of the exit portion 21, as the angles of the first total reflector 12 and the second total reflector 22 are increased, the traveling direction of the light reflected through the first total reflector 12 or the second total reflector 22 is rapidly changed such that uniformity of the light is degraded. Furthermore, when the total length including the first portion 10 and the second portion 20 exceeds fourth times the length of the exit portion 21, as the distance with respect to the exit portion 21 becomes excessive, the light reflected through the first total reflector 12 to travel is additionally reflected in a plurality of times in the second total reflector 22 such that uniformity of the light may be degraded. Therefore, the total length of the first portion 10 and the second portion 20 is formed greater than twice or more and less than or equal to fourth times the length of the exit portion 21 of the second portion 20.

Meanwhile, a bracket 30 may be formed on an external surface of the second total reflector 22, and the bracket 30 may be mounted on one side end portion of the second total reflector 22, which is connected to the second portion 20. That is, the bracket 30 is for mounting the lens 100 to another component 70, and total reflection of the light is not smoothly performed in a portion of the lens 100, in which the bracket 30 is mounted. In the lens 100 in various exemplary embodiments of the present invention formed of the first portion 10 and the second portion 20, the light reflected through the first total reflector 12 travels toward the second total reflector 22 as well as the exit portion 21. Owing to a design characteristics of the second total reflector 22 extending from the first total reflector 12 to be small in diameter, an incident amount of the light is lowest on one side end portion of the second total reflector 22. Thus, the bracket 30 is mounted on the one side end portion of the second total reflector 22, which is connected to the first portion 10 such that an optical loss due to the bracket 30 is minimized, and the lens may be mounted through the bracket 30.

As described above, when the light of the light source 50 is emitted through the exit portion 21, the lens according to various exemplary embodiments of the present invention has a uniform light distribution due to the first portion 10 and the second portion 20. Thus, as shown in FIG. 2, since entirely uniform light is collected on the optical fibers 60 to minimize the difference in brightness for each of the optical fibers 60, quality of lighting through the optical fibers 60 is improved.

Meanwhile, as shown in FIG. 3, an optical fiber lamp apparatus according to various exemplary embodiments of the present invention includes the light source 50 configured to irradiate light; an optical fiber 60 spaced from the light source 50 and configured to irradiate the light to an outside of the optical fiber lamp apparatus when the light is incident on the optical fiber; and the lens 100 mounted between the light source 50 and the optical fiber 60 and including a first portion 10 in which an incident portion 11 having one side to which light from a light source 50 is incident and a first total reflector 12 having a diameter which is gradually increased toward the one side of the first total reflector 12 from the incident portion 11 are formed so that the light irradiated from the light source 50 is reflected to travel toward a second side, and a second portion 20 in which a second total reflector 22 extending from the first total reflector 12 to the other side and having a diameter which is gradually decreased and an exit portion 21 facing optical fibers 60 on one side of the second total reflector 22 are formed, guiding the light which is incident to the first portion 10 and then reflected in the second portion 20 to be collected on the optical fiber 60.

The lens 100 is formed of the first portion 10 having the incident portion 11 and the second portion 20 having the exit portion 21, and since the first total reflector 12 of the first portion 10 and the second total reflector 22 of the second portion 20 are integrally coupled, the lens may be formed as one object. Here, the first total reflector 12 of the first portion 10 is formed to have the diameter which is gradually increased toward the other side from the incident portion 11 and have an inclination so that the light irradiated from the light source 50 is reflected to travel toward the exit portion 21 of the second portion 20. The second total reflector 22 of the second portion 20 is formed to have the diameter which is gradually decreased from the first total reflector 12 and have an inclination. The exit portion 21 facing the optical fibers 60 is formed at a distal end portion of the other side of the second total reflector 22 in the second portion 20. Thus, since the light irradiated from the light source 50 is reflected by the first total reflector 12, is reflected by the second total reflector 22, or directly travels to be emitted through the exit portion 21 facing the optical fibers 60, the light is collected on the optical fibers 60.

As described above, the light of the light source 50, which has a non-uniform light distribution, is collected with a uniform light distribution through the lens 100 formed of the first portion 10 and the second portion 20 so that the light is uniformly incident on a plurality of strands of the optical fiber 60, and thus each strand of the optical fiber 60 may emit light with the same brightness.

Meanwhile, a bracket 30 may be formed on an external surface of the second total reflector 22, and the bracket 30 may be mounted on one side end portion of the second total reflector 22, which is connected to the second portion 20.

In the lens 100 in various exemplary embodiments of the present invention formed of the first portion 10 and the second portion 20, the light reflected through the first total reflector 12 travels toward the second total reflector 22 as well as the exit portion 21. Owing to a design characteristics of the second total reflector 22 extending from the first total reflector 12 to be small in diameter, an incident amount of the light is lowest on one side end portion of the second total reflector 22. Thus, the bracket 30 is mounted on the one side end portion of the second total reflector 22, which is connected to the first portion 10 such that an optical loss due to the bracket 30 is minimized, and the lens may be mounted through the bracket 30.

Meanwhile, as shown in FIG. 4 and FIG. 5, the lens 100 is configured such that the first portion 10 and the second portion 20 are separated, and the bracket 30 is formed on the other side end portion of the first total reflector 12 of the first portion 10, which is connected to the second total reflector 22, and formed one side end portion of second total reflector 22 of the second portion 20, which is connected to the first total reflector 12. As described above, since the lens 100 is configured such that the first portion 10 and the second portion 20 are separated, it is easy to mold each portion. Furthermore, the bracket 30 is formed in the first portion 10 and the second portion 20, and thus the first portion 10 and the second portion 20 are connected to each other through the brackets 30 and mounted on the another component 70 such that a coupling process and a mounting process are simplified.

When lighting using the optical fibers 60, the lens of an optical fiber lamp apparatus, which has the above described structure, and the optical fiber lamp apparatus having the same allow entirely uniform light to be collected on the optical fibers 60 and thus a difference in brightness between the optical fibers 60 is minimized so that quality of lighting is improved through the optical fibers 60.

In accordance with a lens of an optical fiber lamp apparatus, which has the above described structure, and an optical fiber lamp apparatus having the same, when lighting using optical fibers, entirely uniform light is allowed to be collected on an optical fiber and thus a difference in brightness between the optical fibers is minimized so that quality of lighting is improved through the optical fibers.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A lens of an optical fiber lamp apparatus, the lens comprising:
    a first portion including:
        an incident portion having one side to which light from a light source is incident; and
        a first total reflector having a diameter increased toward a first side of the first total reflector from the incident portion disposed at a second side of the first total reflector, wherein the light irradiated from the light source is reflected to travel from the second side of the first total reflector toward the first side of the first total reflector; and
    a second portion including:
        a second total reflector extending from the first side of the first total reflector and having a diameter which is decreased from the first side of the first total reflector; and
        an exit portion facing optical fibers on one side of the second total reflector,
    wherein the light which is incident to the first portion and then reflected is guided through the second portion and the exit portion to be collected on the optical fibers, and
    wherein a total length of the first portion and the second portion is greater than twice or more and less than or equal to four times of a diameter of the exit portion of the second portion.

2. The lens of claim 1, wherein a length of the first portion is formed to be smaller than a length of the second portion.

3. The lens of claim 1, wherein an angle due to an increment in the diameter of the first total reflector is formed to be greater than an angle due to a decrement in the diameter of the second total reflector.

4. The lens of claim 1, wherein an angle between an outer surface of the first total reflector and an imaginary horizontal line is greater than an angle between an outer surface of the second total reflector and the imaginary horizontal line.

5. The lens of claim 1, wherein the incident portion of the first portion includes:
    an incident side portion extending straightly toward the second side of the first total reflector such that the light of the light source travels to the first total reflector therethrough; and
    an incident center portion connected to a distal end portion of the incident side portion in a form of a curved line in the first total reflector so that the light of the light source is converted into a parallel light to travel to the exit portion via the incident center portion.

6. The lens of claim 5, wherein a diameter of the incident side portion is decreased from toward the second side of the first total reflector toward the first side of the first total reflector and extends obliquely or straightly.

7. The lens of claim 1, wherein a diameter of a side end portion of the second total reflector, which is connected to the first total reflector, is formed to be greater than at least twice of the diameter of the exit portion.

8. The lens of claim 1, wherein the exit portion of the second portion is formed as a flat surface.

9. The lens of claim 1, wherein the diameter of the exit portion of the second portion is greater than an outer diameter of the optical fibers.

10. The lens of claim 1, wherein a clearance distance between the exit portion of the second portion and the optical fibers is less than or equal to a difference between the diameter of the exit portion of the second portion and a diameter of the optical fibers.

11. The lens of claim 1,
    wherein a bracket is formed on an external surface of the second total reflector; and wherein the bracket is mounted on a side end portion of the second total reflector, which is connected to the second portion.

12. An optical fiber lamp apparatus, comprising:

a light source configured to irradiate light;

an optical fiber spaced from the light source and configured to irradiate the light to an outside of the optical fiber lamp apparatus when the light is incident on the optical fiber; and a lens mounted between the light source and the optical fiber, wherein the lens includes:

a first portion having an incident portion, wherein the light from the light source is incident on a side of the incident portion, and a first total reflector having a diameter which is increased toward a first side of the first total reflector from the incident portion disposed at a second side of the first total reflector, wherein the light irradiated from the light source is reflected to travel toward the first side of the first total reflector from the second side of the first total reflector; and a second portion including a second total reflector disposing from the first side of the first total reflector and having a diameter which is decreased from the first side of the first total reflector, and an exit portion facing the optical fiber on a side of the second total reflector, guiding the light which is incident to the first portion and then reflected in the second portion to be collected on the optical fiber, wherein a total length of the first portion and the second portion is greater than twice or more and less than or equal to four times of a diameter of the exit portion of the second portion.

13. The optical fiber lamp apparatus of claim 12, wherein a bracket is formed on an external surface of the second total reflector; and wherein the bracket is mounted on a side end portion of the second total reflector, which is connected to the second portion.

14. The optical fiber lamp apparatus of claim 12, wherein the lens is configured such that the first portion and the second portion are separated; and wherein a bracket is formed at a side end portion of the first total reflector of the first portion, which is connected to the second total reflector, and formed at a side end portion of the second total reflector of the second portion, which is connected to the first total reflector.

15. The optical fiber lamp apparatus of claim 12, wherein a length of the first portion is formed to be smaller than a length of the second portion.

16. The optical fiber lamp apparatus of claim 12, wherein an angle between an outer surface of the first total reflector and an imaginary horizontal line is greater than an angle between an outer surface of the second total reflector and the imaginary horizontal line.

17. The optical fiber lamp apparatus of claim 12, wherein the incident portion of the first portion includes:

an incident side portion extending straightly toward a second side of the first total reflector such that the light of the light source travels to the first total reflector through the incident side portion; and an incident center portion connected to a distal end portion of the incident side portion in a form of a curved line in the first total reflector so that the light of the light source is converted into a parallel light to travel to the exit portion via the incident center portion.

* * * * *